United States Patent
Itaya (10) Patent No.: US 8,282,259 B2
(45) Date of Patent: Oct. 9, 2012

(54) BACKLIGHT UNIT AND DISPLAY DEVICE

(75) Inventor: Hideki Itaya, Kawasaki (JP)

(73) Assignee: NLT Technologies, Ltd., Kawasaki (JP)

( * ) Notice: Subject to any disclaimer, the term of this patent is extended or adjusted under 35 U.S.C. 154(b) by 174 days.

(21) Appl. No.: 12/200,385

(22) Filed: Aug. 28, 2008

(65) Prior Publication Data

US 2009/0058306 A1    Mar. 5, 2009

(30) Foreign Application Priority Data

Sep. 4, 2007   (JP) .................................. 2007-228890

(51) Int. Cl.
*F21V 7/04*   (2006.01)

(52) U.S. Cl. .................... 362/612; 362/276; 362/628

(58) Field of Classification Search ............ 362/26, 362/27, 276, 330, 602, 604, 612, 613, 621, 362/628, 631; 349/65
See application file for complete search history.

(56) References Cited

U.S. PATENT DOCUMENTS

| | | | | |
|---|---|---|---|---|
| 6,964,500 | B2 * | 11/2005 | Sakai | 362/276 |
| 7,667,789 | B2 * | 2/2010 | Choi et al. | 362/276 |
| 7,687,295 | B2 | 3/2010 | Washino et al. | |
| 7,748,884 | B2 * | 7/2010 | Yoshino et al. | 362/613 |
| 2006/0239034 | A1 * | 10/2006 | Keh et al. | 362/613 |
| 2008/0084520 | A1 * | 4/2008 | Nam et al. | 362/612 |
| 2008/0094348 | A1 * | 4/2008 | Yin et al. | 349/65 |
| 2008/0203404 | A1 | 8/2008 | Washino et al. | |
| 2009/0046455 | A1 | 2/2009 | Yoshino et al. | |

FOREIGN PATENT DOCUMENTS

| | | |
|---|---|---|
| CN | 101034229 A | 9/2007 |
| JP | 2005-71702 A | 3/2005 |
| JP | 200570065 A | 3/2005 |
| JP | 200718846 A | 1/2007 |
| JP | 2007-47352 A | 2/2007 |
| JP | 2007-240649 A | 9/2007 |

OTHER PUBLICATIONS

Japanese Office Action dated Dec. 28, 2011 issued in Japanese Application No. 2007-228890.

* cited by examiner

*Primary Examiner* — Y My Quach Lee
(74) *Attorney, Agent, or Firm* — Sughrue Mion, PLLC (57) ABSTRACT

The light-guide plate has an extended portion. The extended portion has a recess formed in a thickness direction, and the optical sensor is arranged within the recess.

7 Claims, 9 Drawing Sheets

BACKLIGHT UNIT AND DISPLAY DEVICE

This application is based upon and claims the benefit of priority from Japanese patent application No. 2007-228890, filed Sep. 4, 2007, the disclosure of which is incorporated herein in its entirety by reference.

BACKGROUND OF THE INVENTION

The present invention relates to a backlight unit and a display device having a backlight unit.

Transmission-type liquid-crystal display devices are display devices designed to display an image by applying a voltage to liquid crystals to change orientation thereof to thereby selectively transmit light.

In many such devices, a backlight unit for generating transmitted light is provided on the back face of a liquid crystal display.

A backlight unit typically has a light source for emitting light and a light-guide plate for guiding the light emitted by the light source to a display device.

When such a backlight unit is provided, however, the light source or the shielding material thereof will be deteriorated by the usage thereof, and such deterioration may change the optical characteristics of transmitted light, resulting in deterioration of the display quality.

If this is the case, the optical characteristics of transmitted light must be controlled to improve the display quality. It is thus desirable to provide units for detecting the optical characteristics of the transmitted light to obtain information required for the control.

It has therefore been proposed to provide an optical sensor to face a light-guide plate, so that the optical characteristics of light transmitted by the light-guide plate are detected to control the optical characteristics of light emitted by the light source.

The optical sensor need be arranged at a position not blocking the transmitted light directed to the display device.

A configuration satisfying these requirements is disclosed in Japanese Laid-Open Patent Publication No. 2005-70065 (Patent Document 1), in which a dimension of a light-guide plate is extended to be greater than a display area and a photo detector (optical sensor) is provided to face the extended portion.

Figure 9A:
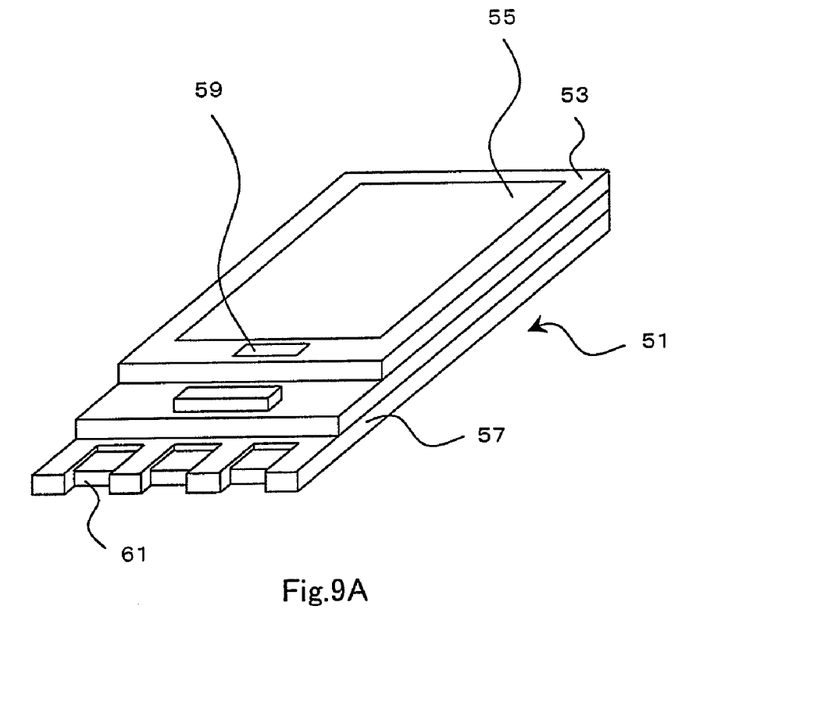
FIG. 9A is a perspective view showing a display device 51.

Specifically, FIG. 9A depicts a display device 51 in which a dimension of a light-guide plate 57 is extended to be greater than a display area 55 of a display panel 53.

An optical sensor 59 is provided to face the extended portion.

According to this configuration, the optical sensor 59 is arranged at a position not blocking transmitted light emitted by a light source 61.

Further, Japanese Laid-Open Patent Publication No. 2007-18846 (Patent Document 2) describes a configuration in which an optical sensor is arranged to face a side of a light-guide plate.

Figure 9B:
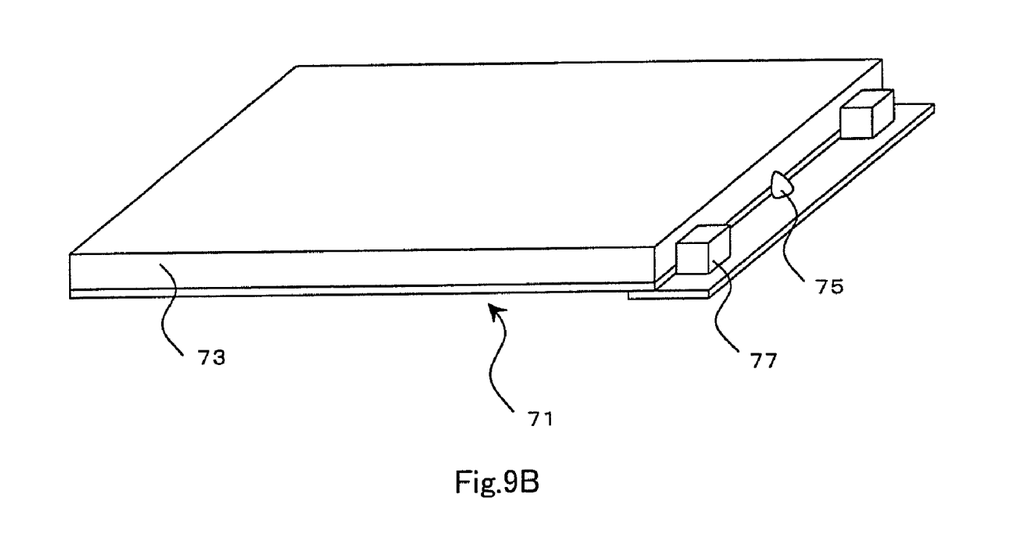
FIG. 9B is a perspective view showing a backlight unit 71 in the display device 51.

Specifically, FIG. 9B depicts a backlight unit 71 in which an optical sensor 75 and a light source 77 are arranged to face the side of a light-guide plate 73.

According to this configuration, the optical sensor 75 is arranged at a position not blocking transmitted light emitted by the light source 77.

SUMMARY OF THE INVENTION

However, the configuration as disclosed in Patent Document 1 involves a problem that the thickness of the backlight unit is increased by the thickness of the optical sensor, and therefore it is difficult to provide this type of backlight unit in a thin display device such as a mobile terminal.

The configuration disclosed in Patent Document 2 also involves a problem that the configuration is not applicable if the thickness of the light-guide plate is smaller than the dimension of the detector of the optical sensor.

The present invention has been made in view of these problems, and it is an object of the invention to provide a backlight unit which can be formed thin regardless of dimensions or shape of the detector of the optical sensor.

In order to achieve the object above, a first aspect of the invention provides a backlight unit having a light source, a light-guide plate provided in the light source, an optical sensor arranged to face the light-guide plate and having a photo detector for receiving light. The light-guide plate has an extended portion. The extended portion has a recess formed in a thickness direction, and the optical sensor is arranged within the recess.

A second aspect of the invention provides a display device including a display unit, and a backlight unit for applying light to the display unit. The backlight unit includes a light source, a light-guide plate provided in the light source for guiding light emitted by the light source to the display unit, and an optical sensor arranged to face the light-guide plate and having a photo detector for receiving light. The light-guide plate has an extended portion arranged to extend out of the display area of the display unit. The extended portion has a recess formed in a thickness direction, and the optical sensor is arranged within the recess.

BRIEF DESCRIPTION OF THE DRAWINGS

FIG. 3 is an exploded view (perspective view) showing a display device 3a having a backlight unit 1a;

DETAILED DESCRIPTION OF THE INVENTION

Preferred embodiments of the present invention will be described in detail with reference to the accompanying drawings.

First, referring to FIGS. 1A and 1B and FIG. 2, description will be made of a schematic configuration of a display device 3 having a backlight unit 1 according to a first embodiment of the present invention.

The display device 3 illustrated as an example herein is a transmission-type liquid-crystal display device.

Figure 1A:
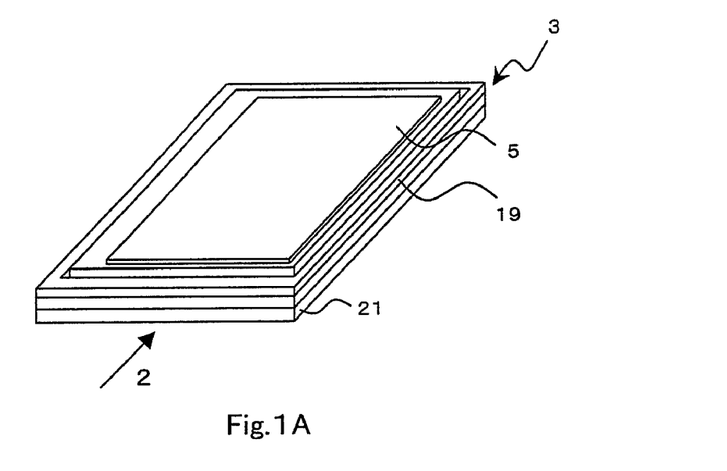
FIG. 1A is a perspective view showing a display device having a backlight unit 1.
Figure 1B:
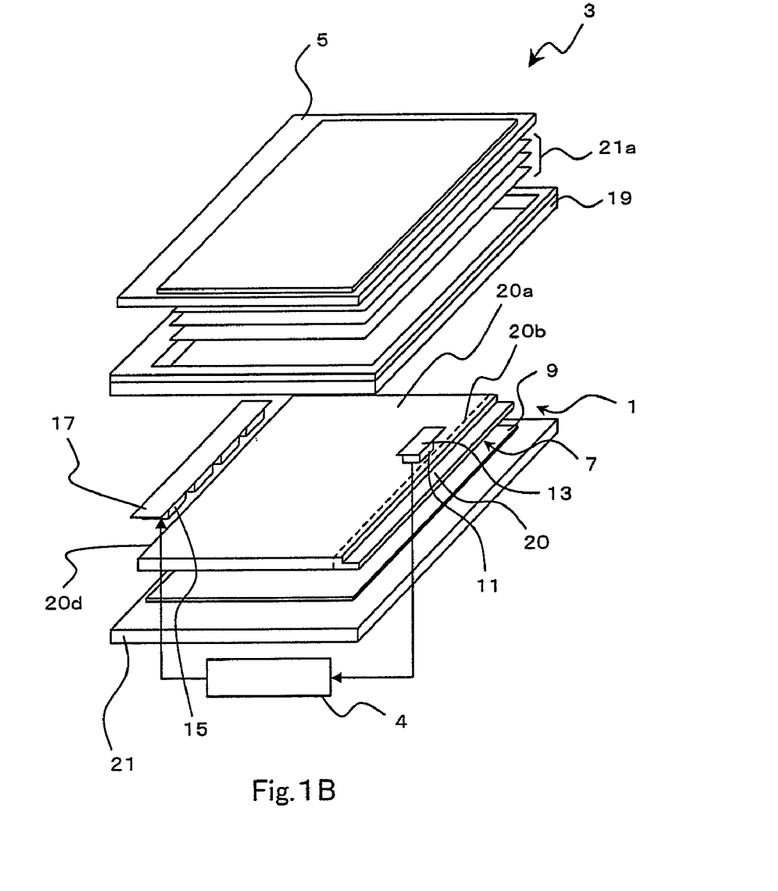
FIG. 1B is an exploded view of FIG. 1A.
Figure 2:
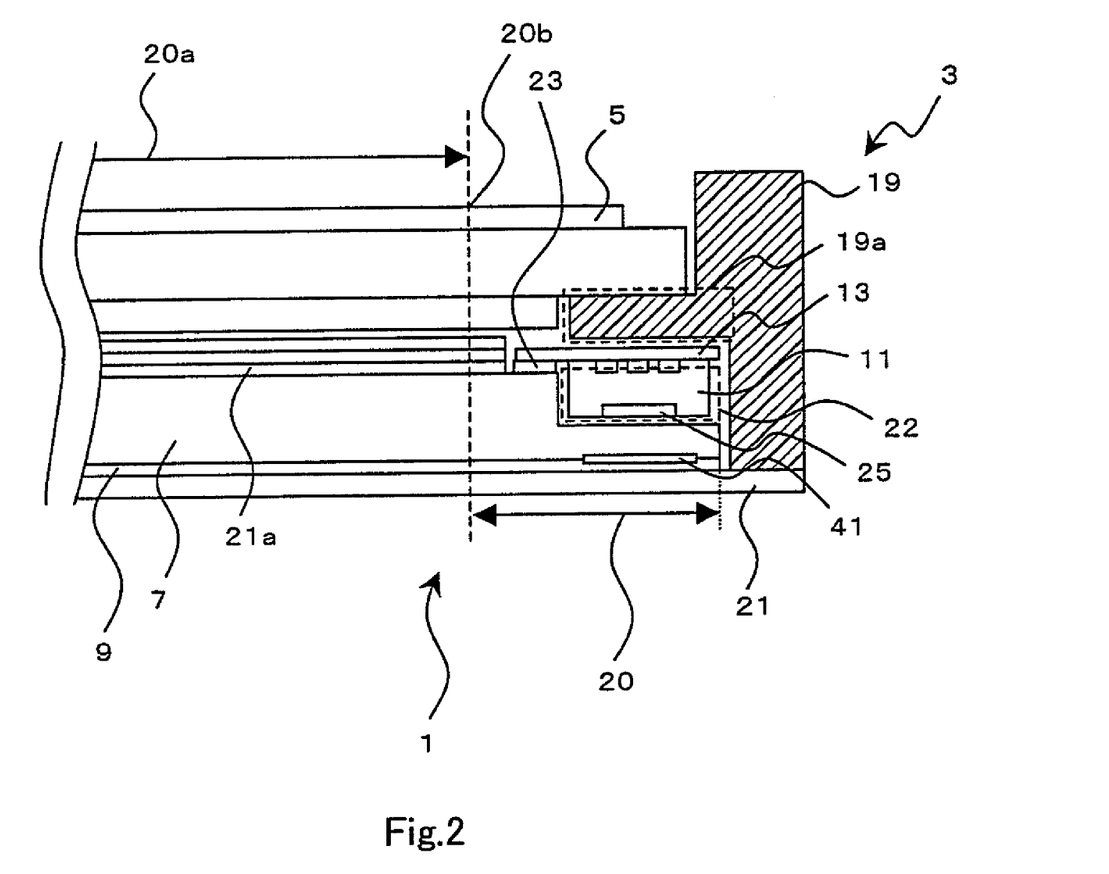
FIG. 2 is a diagram as viewed in the direction of the arrow 2 of FIG. 1A, in which a mold frame 19 is shown in a cross-sectional view.

As shown FIGS. 1A and 1B and FIG. 2, the display device 3 has a liquid crystal display panel 5 as a display unit, and a backlight unit 1 arranged beneath the liquid crystal display panel 5.

An image is displayed by light emitted by the backlight unit 1 and passing through the liquid crystal display panel 5.

A configuration of the display device 3 will be described in further detail.

As shown in FIGS. 1A and 1B and FIG. 2, the display device 3 has a metal frame 21 serving as a base, and a reflective sheet 9 is arranged on the metal frame 21 to reflect light emitted by a light source 15 to be described later.

A light-guide plate 7 is provided on the reflective sheet 9 to guide light emitted by the light source 15 to the liquid crystal display panel 5.

The light-guide plate 7 is provided with the light source 15 formed by emitting light.

For example, light source 15 is formed by a LED (light emitting diode).

When the light source 15 is formed by a LED, the LED may be either a white LED or a combination of a plurality of LEDs having different colors.

An optical sensor 11 for detecting light is provided to face the light-guide plate 7.

A control device 4 is connected to the light source 15 and the optical sensor 11 to control the optical characteristics (luminance, chromaticity, etc.) of light emitted by the light source 15.

An optical sheet 21a is provided on the upper face of the light-guide plate 7 to cause the light from the light-guide plate 7 to be efficiently input to the liquid crystal display panel 5.

The reflective sheet 9, the light-guide plate 7, the light source 15, the optical sheet 21a, and the control device 4 together form a backlight unit 1.

On the other hand, the metal frame 21 is provided with a frame-shaped mold frame 19 for housing the backlight unit 1 and the liquid crystal display panel 5 such that the backlight unit 1 is covered with the mold frame 19.

The mold frame 19 has an inner frame 19a arranged on the inner periphery thereof, and the liquid crystal display panel 5 is arranged on the inner frame 19a.

Light emitted by the light source 15 is input to the liquid crystal display panel 5 by the light-guide plate 7 through the optical sheet 21a. Any light leaked from the bottom of the light-guide plate 7 is reflected by the reflective sheet 9 and input to the liquid crystal display panel 5.

The liquid crystal display panel 5 displays an image by selectively transmitting the light depending on orientation of the liquid crystal.

A part of the light incident to the light-guide plate 7 is input to the optical sensor 11.

When detecting the incident light, the optical sensor 11 transmits information relating to optical characteristics of the incident light to the control device 4.

Receiving the information, the control device 4 controls the optical characteristics of the light emitted by the light source 15 based on the received optical characteristics information.

Next, a configuration of the backlight unit 1 will be described in further detail.

As shown in FIG. 1B and FIG. 2, the light-guide plate 7 has a main portion 20a with the same dimensions and shape as those of the display area of the display device 3 (liquid crystal display panel 5).

Since the display area has a rectangular shape in this embodiment, the main portion 20a also has a rectangular shape.

Although a margin referred to as "frame" may be provided around the main portion 20a in some cases, the illustration of such frame is omitted in FIG. 1B and FIG. 2.

A side 20b as an outer periphery defining the rectangle of the main portion 20a has a strip-shaped extended portion 20 provided to extend along the side 20b.

In other words, the extended portion 20 is arranged to extend out of the display area of the display device 3 (liquid crystal display panel 5).

Although FIG. 1B and FIG. 2 depict that not only the main portion 20a but also the light-guide plate 7 as a whole, including the extended portion 20, has a rectangular shape, the shape is not limited to rectangular but may be various other shapes.

As shown in FIG. 2, the extended portion 20 is formed with a recess 22 in a thickness direction. In FIG. 2, the recess 22 is formed in the surface of the extended portion 20 (light-guide plate 7).

This means that the recess 22 is provided in the surface (front face) of the extended portion 20 (light-guide plate 7) in a part of the light-guide plate 7.

The optical sensor 11 is arranged within the recess 22 to face the bottom of the recess 22.

The optical sensor 11 has a photo detector 25 for detecting light, which is arranged on the face facing the bottom of the recess 22.

The optical sensor 11 is provided with a sensor board 13 such as a FPC (flexible printed circuit) for driving the optical sensor 11, and one end of the sensor board 13 is connected to the light-guide plate 7 by a double-sided adhesive tape 23.

The sensor board 13 may be connected to the mold frame 19 or the liquid crystal display panel 5, instead of the light-guide plate 7.

The light-guide plate 7 has a reflection pattern 41 provided on the bottom thereof to face the photo detector 25. The reflection pattern 41 is a concave-convex surface or printed surface for adjusting the quantity of light incident to the photo detector 25.

Additionally, a light source board 17 for driving the light source 15 is provided on the side 20d opposite the side 20b, and the light source board 17 is provided with the light source 15.

According to this configuration, the thickness of the backlight unit 1 does not affect the dimension or shape of the detector (photo detector 25) of the optical sensor 11 since the optical sensor 11 is arranged within the recess 22.

Accordingly, the backlight unit 1 can be formed thin regardless of the dimension or shape of the detector (photo detector 25) of the optical sensor 11.

For example, when the optical sensor 11 has a thickness of 0.7 mm and the light-guide plate 7 has a thickness of 1.0 mm, the optical sensor 11 can be housed in the recess 22 if the thickness of the bottom of the recess 22 is set to 0.3 mm.

The thickness of the sensor board 13 is desirably smaller than that of the optical sheet 21a. The presence of the sensor board 13 will not hinder the thin formation of the backlight unit 11 when the sensor board 13 has such a thickness.

Specifically, for example, the thickness of the sensor board 13 may be set to 0.2 mm when the optical sheet 21a has a thickness of 0.3 mm.

The optical sensor 11 is arranged within the recess 22, while the recess 22 is provided in the extended portion 20.

The extended portion 20 is arranged to extend out of the display area of the display device 3 (liquid crystal display panel 5).

Therefore, the optical sensor 11 is arranged outside the display area of the display device 3 (liquid crystal display panel 5), and thus the optical sensor 11 will not be an obstacle when light is directed from the backlight unit 1 to the liquid crystal display panel 5.

The part of the light-guide plate 7 facing the optical sensor 11 (the bottom of the recess 22) has a smaller thickness than the main portion 20a located within the display area.

However, optical characteristics (luminance and so on) of the light input to the optical sensor 11 from the bottom of the recess 22 (the light detected by the optical sensor 11) change in conjunction with the change in optical characteristics of the light input from the main portion 20a to the liquid crystal display panel 5.

This enables the control device 4 to control the light source 15 based on information of the received light, regardless of the thickness of the bottom of the recess 22.

The recess 22 is formed by cutting away a part or the entire of the extended portion 20.

According to the first embodiment, as described above, the backlight unit 1 of the display device 3 has the extended portion 20 arranged to extend out of the display area of the liquid crystal display panel 5, and the optical sensor 11 is arranged within the recess 22 provided in the extended portion 20.

This makes it possible to form the backlight unit 1 thin, regardless of the dimension and shape of the detector (photo detector 25) of the optical sensor 11. Further, this prevents the occurrence of uneven luminance in the display area.

Next, a second embodiment of the invention will be described with reference to FIG. 3 and FIG. 4.

A backlight unit 1a according to the second embodiment is similar to the backlight unit 1 of the first embodiment except that the recess 22 is provided in the rear face of the extended portion 20.

In the following description of the second embodiment, elements having the same functions as those of the first embodiment are assigned with same reference numerals and description thereof will be omitted.

Figure 3:
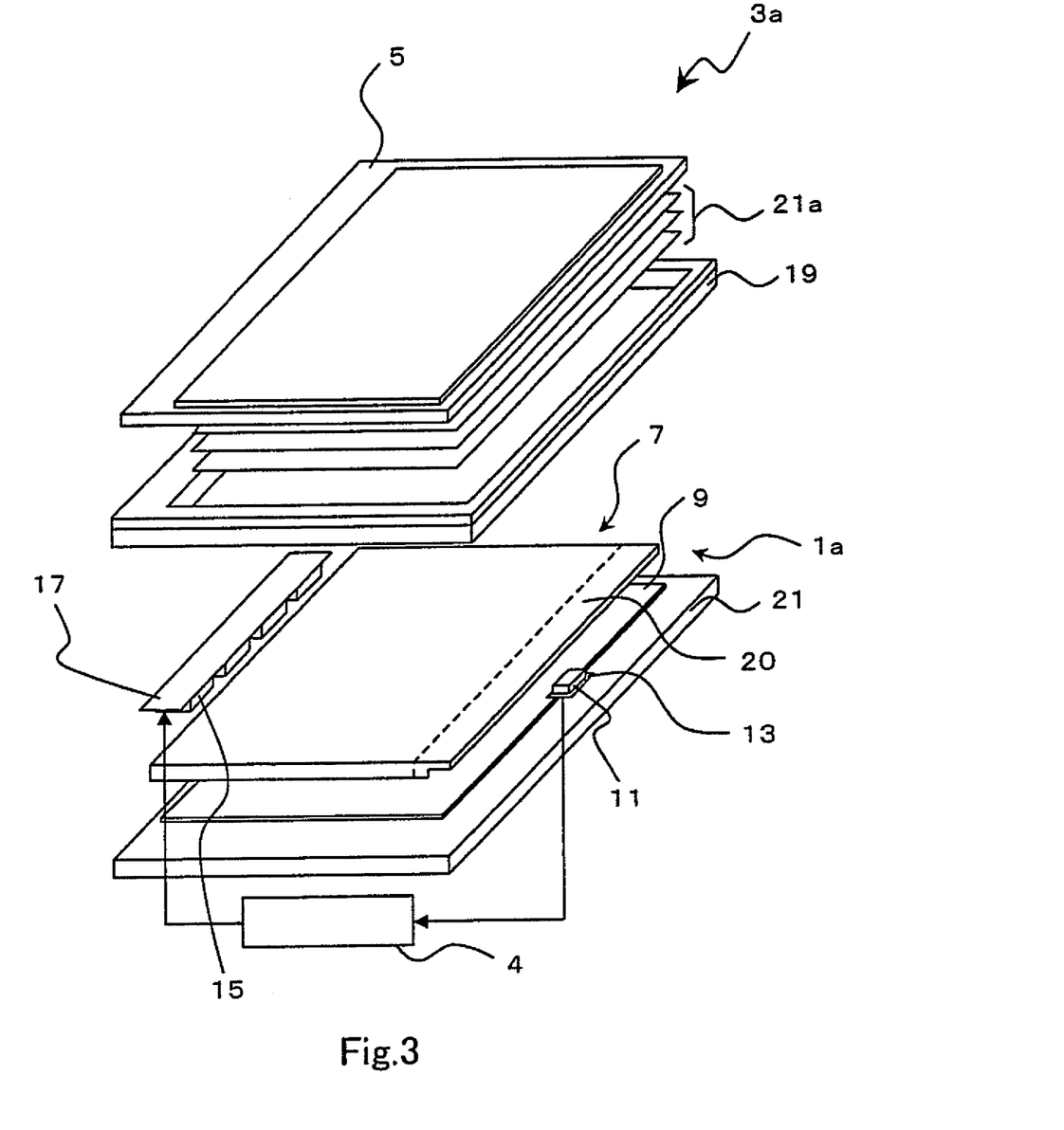
Figure 4:
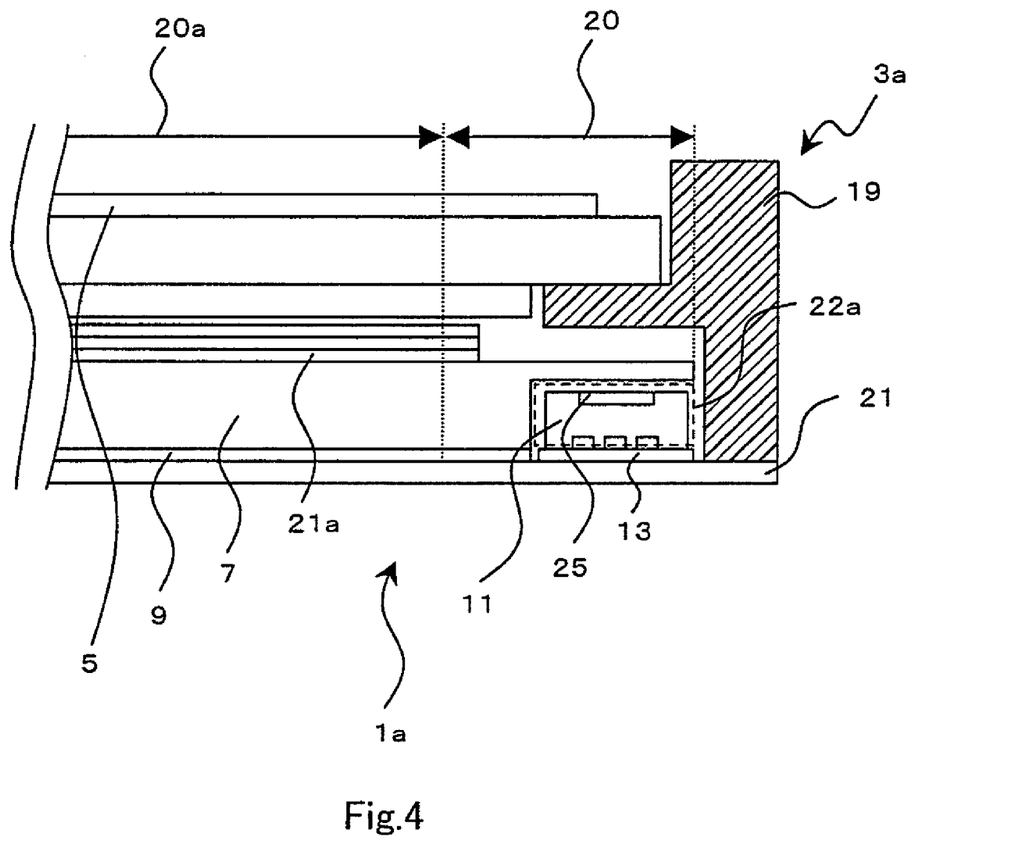
FIG. 4 is a side view of FIG. 3, in which a mold frame 19 is shown in a cross-sectional view.

As shown in FIG. 3 and FIG. 4, a recess 22a is formed in a thickness direction in the rear face of an extended portion 20 (light-guide plate 7) of the backlight unit 1a.

An optical sensor 11 is formed in the recess 22a to face the bottom of the recess 22a.

A sensor board 13 is provided on the bottom of the optical sensor 11, and the sensor board 13 is held by a metal frame 21.

The recess 22a may be provided in the rear face of the extended portion 20 in this manner, and this improves the design freedom.

According to the second embodiment, as described above, the backlight unit 1a of the display device 3a has the extended portion 20 arranged to extend out of the display area of the liquid crystal display panel 5, and the optical sensor 11 is arranged within the recess 22a formed in the extended portion 20.

Accordingly, the second embodiment provides similar effects as those of the first embodiment.

Next, a third embodiment will be described with reference to FIG. 5.

A backlight unit 1b according to the third embodiment is similar to the backlight unit 1 of the first embodiment except that a light-shielding double-sided adhesive tape 31 is provided around the photo detector 25.

In the following description of the third embodiment, elements having the same functions as those of the first embodiment will be assigned with the same reference numerals and description thereof will be omitted.

Figure 5:
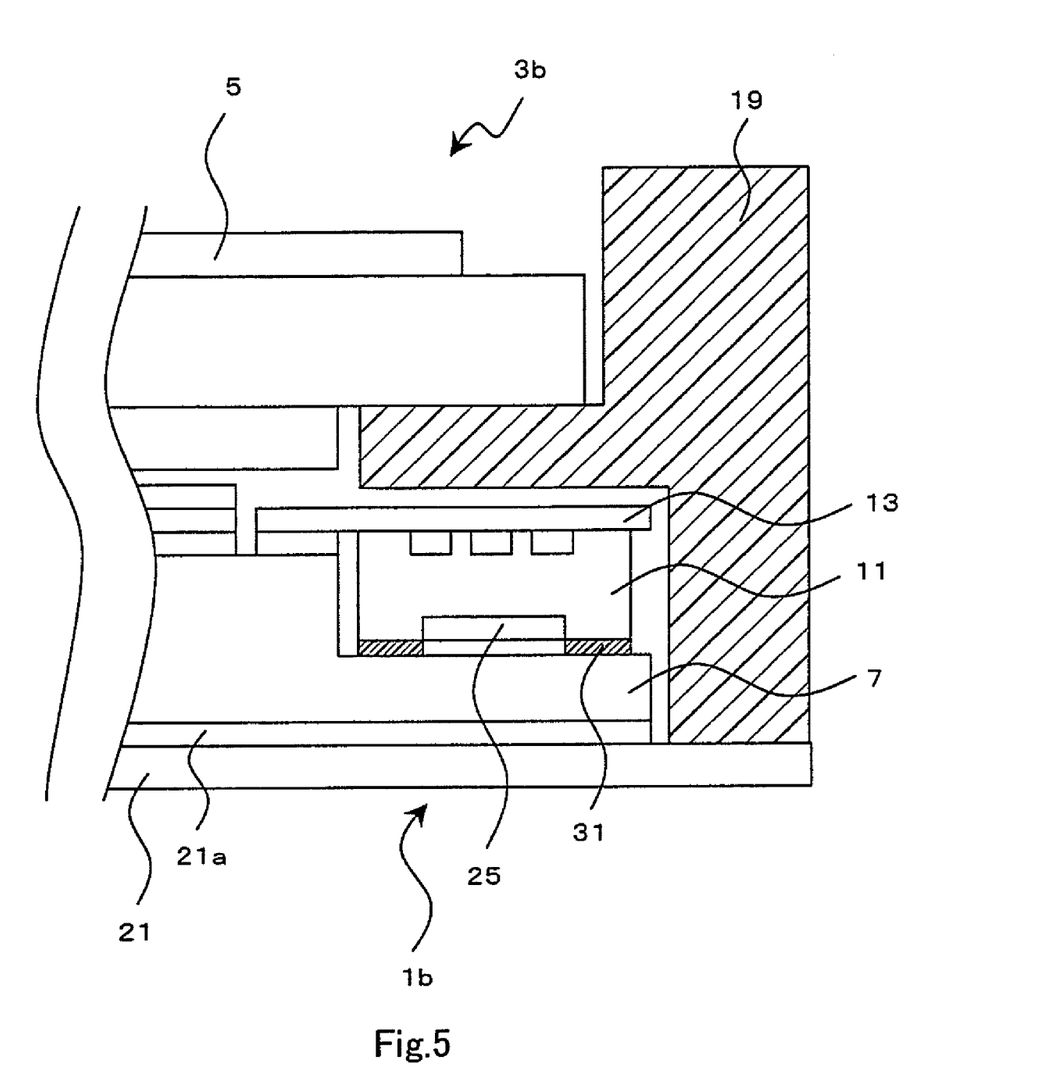
FIG. 5 is a side view showing a display device 3b having a backlight unit 1b, in which a mold frame 19 and a light-shielding double-sided adhesive tape 31 are shown in a cross-sectional view.

As shown in FIG. 5, a light-shielding double-sided adhesive tape 31 serving as the light-shielding portion is provided around the photo detector 25 of the optical sensor 11.

Instead of the light-shielding double-sided adhesive tape 31, a single-sided adhesive tape or cover having a light-shielding function may be used as the light-shielding portion.

The provision of the light-shielding double-sided adhesive tape 31 makes it possible to shield light that is otherwise incident to the photo detector from the periphery of the optical sensor 11, and to enhance the optical intensity detecting accuracy of the optical sensor 11.

According to the third embodiment, as described above, the backlight unit 1b of the display device 3b has the extended portion 20 arranged to extend out of the display area of the liquid crystal display panel 5 and the optical sensor 11 is arranged within the recess 22 formed in the extended portion 20.

Accordingly, the third embodiment provides similar functions to those of the first embodiment.

Further, according to the third embodiment, the light-shielding double-sided adhesive tape 31 serving as the light-shielding portion is provided around the photo detector 25 of the optical sensor 11.

This makes it possible to shield light that will otherwise be incident to the photo detector 25 from the periphery of the optical sensor 11, and to improve the optical intensity detecting accuracy of the optical sensor 11 further than the first embodiment.

A fourth embodiment will be described with reference to FIG. 6.

A backlight unit 1c according to the fourth embodiment is similar to the backlight unit 1 of the first embodiment except that an extended portion 43 is provided only in a part of the side 20b.

In the following description of the fourth embodiment, elements having the same functions as those of the first embodiment are assigned with same reference numerals and description thereof will be omitted.

Figure 6:
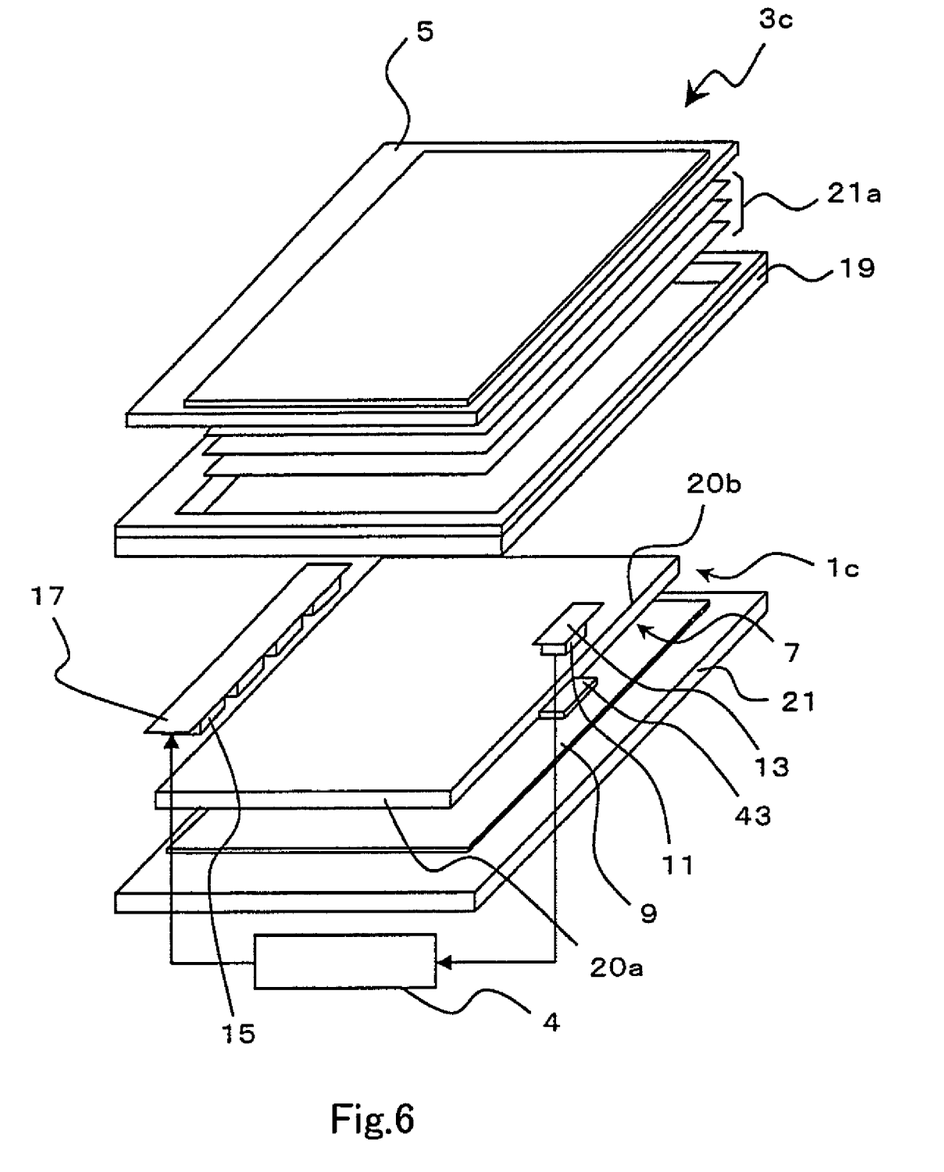
FIG. 6 is an exploded view (perspective view) showing a display device 3c having a backlight unit 1c.

As shown in FIG. 6, the backlight unit 1c has an extended portion 43 provided in a part of the side 20b.

The extended portion 43 should be provided at least in a part of the side 20b. This means that the extended portion 43 may be provided only in a part thereof. This configuration makes it possible to minimize the increase in the size of the light-guide plate caused by the provision of the extended portion 43, and to reduce the quantity of wasted light that is emitted from the extended portion.

According to the fourth embodiment, as described above, the backlight unit 1c of the display device 3c has the extended portion 43 arranged to extend out of the display area of the liquid crystal display panel 5, and the optical sensor 11 is arranged within the recess 22 formed in the extended portion 43.

Accordingly, the fourth embodiment provides similar effects to those of the first embodiment.

Further, in the backlight unit 1c according to the fourth embodiment, the extended portion 43 is provided only in a part of the side 20b.

This makes it possible to minimize the increase in size of the light-guide plate 7 caused by the provision of the extended portion 43, and to reduce the quantity of wasted light emitted from the extended portion in comparison with the first embodiment.

A fifth embodiment will be described with reference to FIG. 7 and FIG. 8.

A backlight unit $1d$ according to the fifth embodiment is similar to the backlight unit 1 of the first embodiment except that the light source 15 and the optical sensor 11 are connected to the same side of the main portion $20a$.

In the following description of the fifth embodiment, elements having the same functions as those of the first embodiment are assigned with same reference numerals and description thereof will be omitted.

Figure 7:
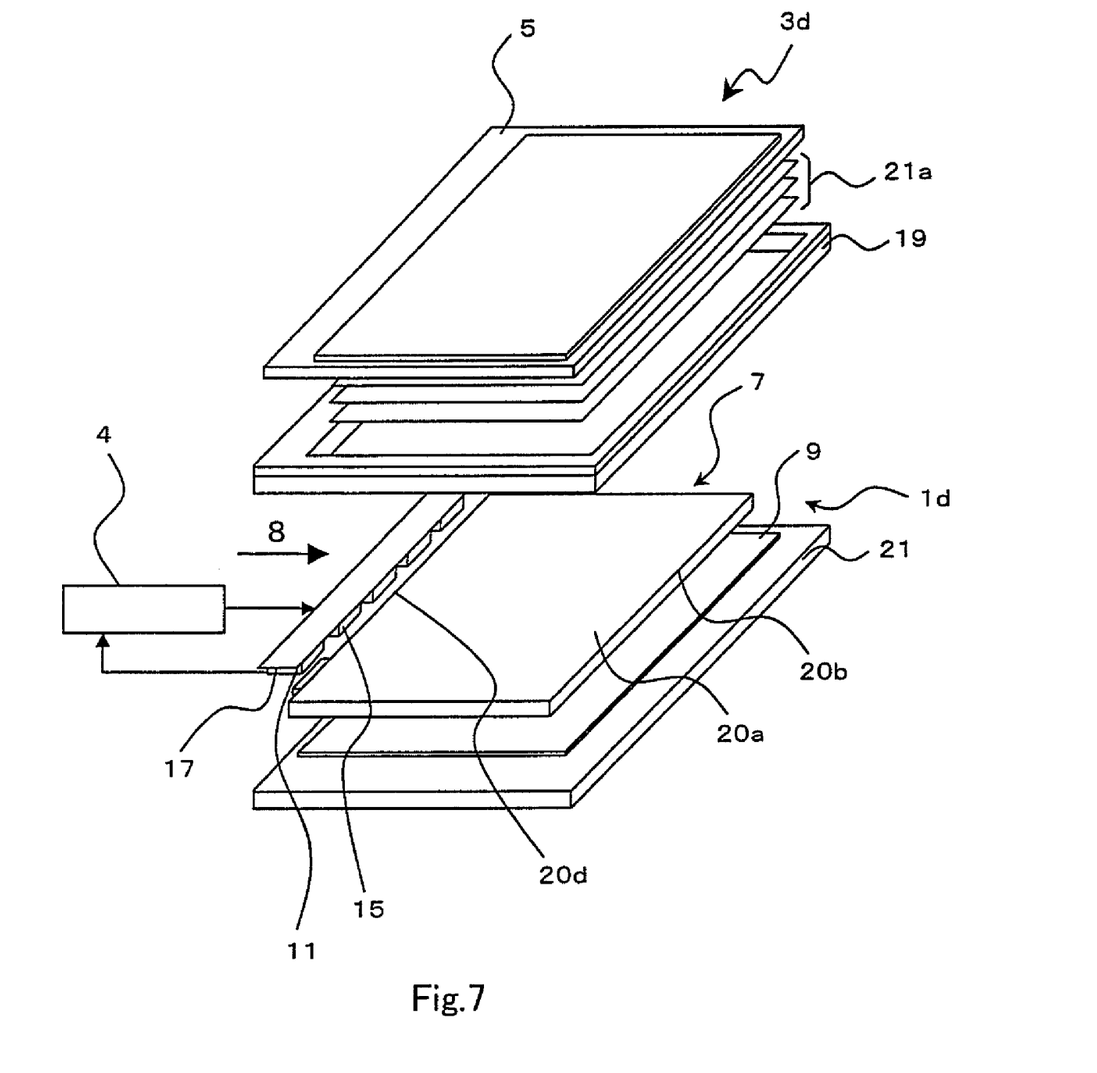
FIG. 7 is an exploded view (perspective view) showing a display device 3d having a backlight unit 1d.
Figure 8:
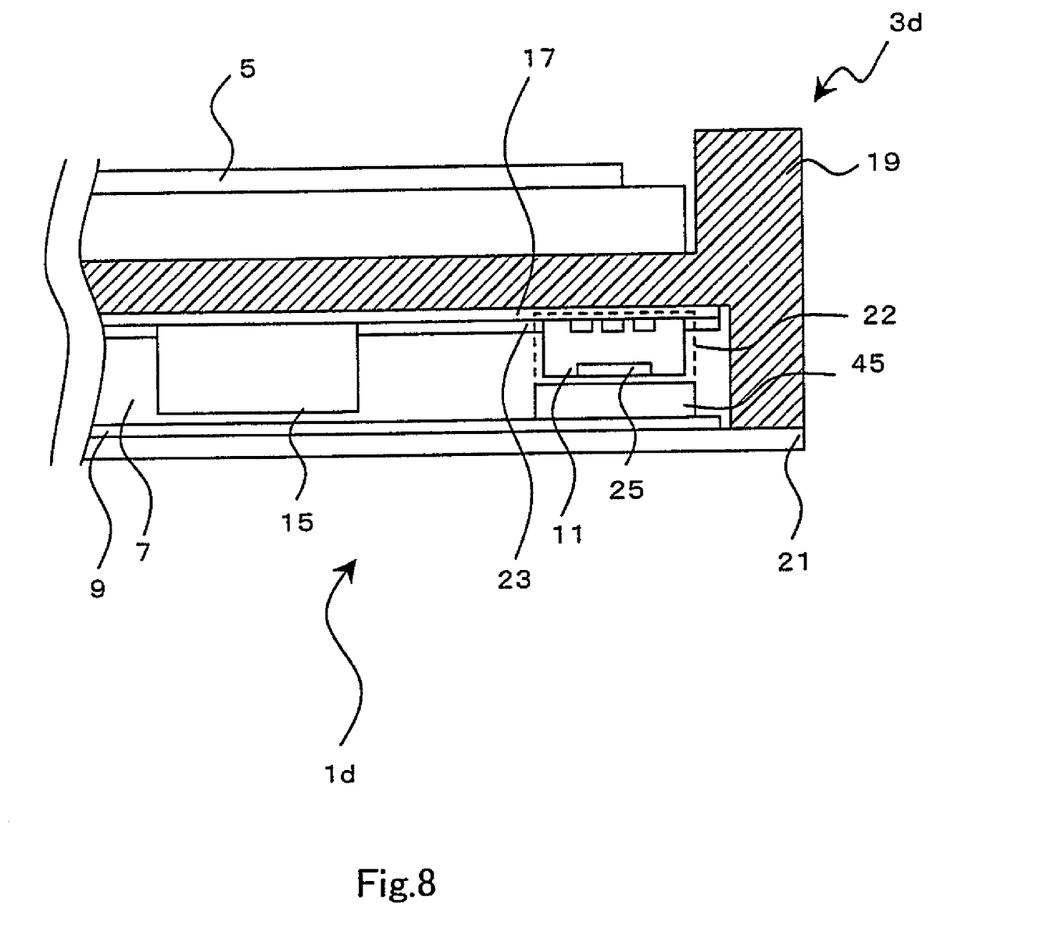
FIG. 8 is a diagram as viewed in the direction of the arrow 8 in FIG. 7, in which a mold frame 19 is shown in a cross-sectional view.

As shown in FIG. 7 and FIG. 8, the light source 15 and the optical sensor 11 are provided on a light source board 17, and the light source board 17 is connected to the side $20d$ of the main portion $20a$.

This means that, the light source 15 and the optical sensor 11 are connected to the same side $20d$ of the main portion $20a$.

Further, an extended portion 45 is provided in a part of the side $20d$, and the recess 22 is provided in the extended portion 45.

The optical sensor 11 is arranged within the recess 22.

The configuration in which the light source 15 and the optical sensor 11 are connected to the same side of the main portion $20a$ makes it possible to provide the light source 15 and the optical sensor 11 on the same board (light source board 17).

Therefore, the number of parts of the backlight unit $1d$ can be reduced, resulting in cost reduction.

Further, this configuration eliminates the need of providing an extended portion in the side $20b$ opposite the side $20d$ on which the light source 15 is provided, and hence the size of the light-guide plate 7 can be reduced.

Further, when there is a frame provided around the main portion $20a$, the frame part in contact with the side $20b$ can be made smaller.

According to the fifth embodiment, as described above, the backlight unit $1d$ of the display device $3d$ has the extended portion 45, and the optical sensor 11 is arranged within the recess 22 formed in the extended portion 45.

Therefore, the fifth embodiment provides similar effects to those of the first embodiment.

Further, according to the fifth embodiment, the light source 15 and the optical sensor 11 are connected to the same side $20d$ of the main portion $20a$.

Therefore, the light source 15 and the optical sensor 11 can be provided on the same board (light source board 17), and hence the number of parts of the backlight unit $1d$ can be reduced, resulting in cost reduction.

Further, the configuration as described above eliminates the need of providing an extended portion on the side $20b$ opposite the side $20d$ on which the light source 15 is provided, and thus the size of the light-guide plate 7 can be reduced.

Although the description of the embodiments above has been made in terms of a case in which the present invention is applied to a transmission-type liquid-crystal display device, the present invention is not limited to this but is applicable to all other display devices requiring back light.

For example, one aspect of the present invention relates to a backlight unit having a recess formed in a thickness direction in the extended portion. However, according to another embodiment, the recess may be formed in the front or rear face of the light-guide plate.

According to another embodiment of backlight unit of the present invention, the optical sensor may be arranged to face the bottom of the recess.

Further, according to another embodiment of backlight unit of the present invention, the backlight unit may have a light-shielding portion provided around the photo detector.

According to another embodiment of backlight unit of the present invention, the light-guide plate may have a main portion and the extended portion may be a strip-shaped portion provided along an outer periphery of the main portion.

Further, according to another embodiment of backlight unit of the present invention, the main portion may have a rectangular shape in a plan view, and the extended portion may be provided in at least a part of a side of the rectangle.

Further, according to another embodiment of backlight unit of the present invention, the light-guide plate has a rectangular shape in a plan view, and the light source and the optical sensor are connected to a same one of the sides defining the rectangle of the light-guide plate.

Still further, according to another embodiment of backlight unit of the present invention, the light source and the optical sensor may have a board provided in the light source and the optical sensor, and the light source and the optical sensor may be connected to a same one of the sides defining the rectangle of the light-guide plate through the board.

Another aspect of the present invention relates to a display device including a display unit and a backlight unit for applying light to the display unit. The backlight unit has a light source, a light-guide plate provided in the light source for guiding light emitted by the light source to the display unit, and an optical sensor arranged to face the light-guide plate and having a photo detector for receiving light. The light-guide plate has an extended portion arranged to extend out of the display area of the display unit. The extended portion has a recess formed in a thickness direction, and the optical sensor is arranged within the recess. According to another embodiment, the recess may be provided in the front or rear face of the light-guide plate.

According to another embodiment of display device of the present invention, the optical sensor may be arranged to face the bottom of the recess.

Further, according to another embodiment of display device of the present invention, the display device may have a light-shielding portion provided around the photo detector.

According to another embodiment of display device of the present invention, the light-guide plate may have a main portion having similar dimensions and shape to the display area of the display unit, and the extended portion may be a strip-shaped portion provided along an outer periphery of the main portion.

According to another embodiment of display device of the present invention, the main portion may have a rectangular shape in a plan view, and the extended portion may be provided in at least a part of a side of the rectangle.

According to another embodiment of display device of the present invention, the light-guide plate may have a rectangular shape in a plan view, and the light source and the optical sensor may be connected to a same one of the sides defining the rectangle of the light-guide plate.

According to another embodiment of display device of the present invention, the light source and the optical sensor may have a board provided in the light source and the optical sensor, and the light source and the optical sensor may be connected, through the board, to a same one of the sides defining the light-guide plate.

According to the embodiments described above, the backlight unit has an extended portion provided to extend out of the display area of the display device, and an optical sensor is arranged within a recess formed in a thickness direction in the extended portion.

Accordingly, the thickness of the backlight unit does not depend on the dimensions or the shape of the detector of the optical sensor.

According to the present invention, a backlight unit can be provided, which can be formed thin regardless of dimensions or shape of the detector of an optical sensor.

What is claimed is:

1. A display device comprising:
   a display unit; and
   a backlight unit for applying light to the display unit, the backlight unit comprising:
   a light source;
   a light-guide plate provided at the light source for guiding light emitted by the light source to the display unit,
   an optical sensor arranged to face the light-guide plate and having a photo detector for receiving light;
   a light-shielding portion that shields light that is otherwise incident to the photo detector from the periphery of the optical sensor, the light-shielding portion being provided around the photo detector; and
   a board provided on the optical sensor,
   wherein the light-guide plate has an extended portion,
   wherein the board is held to face the extended portion, and
   wherein the extended portion is arranged to extend out of the display area of the display unit, the extended portion having a recess formed in a thickness direction thereof, and the optical sensor is arranged within the recess and the photo detector is arranged to face a bottom of the recess for receiving light emitted from the bottom of the recess.

2. The display device according to claim 1, wherein the recess is formed in a rear face of the light-guide plate.

3. The display device according to claim 1, wherein the light-guide plate has a main portion having equal dimensions and shape to those of the display area of the display unit, and the extended portion is a strip-shaped portion provided along an outer periphery of the main portion.

4. The display device according to claim 3, wherein the main portion has a rectangular shape in a plan view, and the extended portion is provided along at least a part of one side of the rectangle.

5. The display device according to claim 3, wherein the light-guide plate has a rectangular shape in a plan view, and the light source and the optical sensor are connected to a same one of the sides defining the rectangle of the light-guide plate.

6. The display device according to claim 1, further comprising a metal frame, wherein the board is held by the metal frame.

7. The display device according to claim 1, wherein the optical sensor is disposed between the board and the extended portion.

* * * * *